May 22, 1934.  G. C. BROWN  1,960,137
ARTICLE OF MANUFACTURE
Filed Sept. 26, 1932
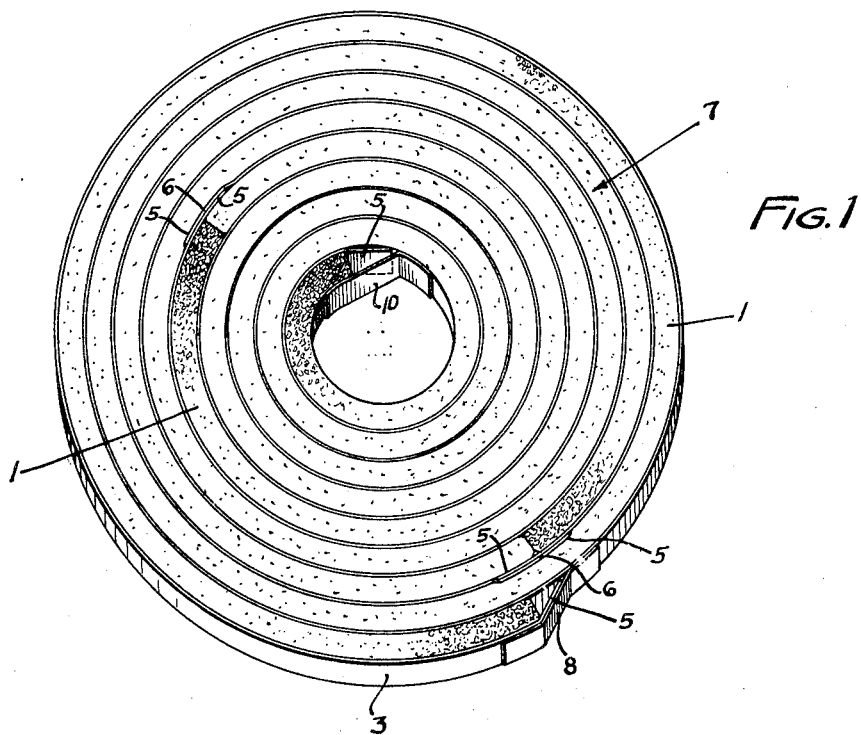
Fig.1
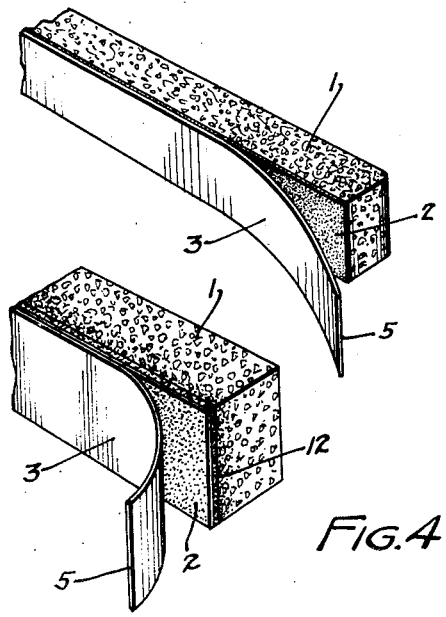
Fig.2
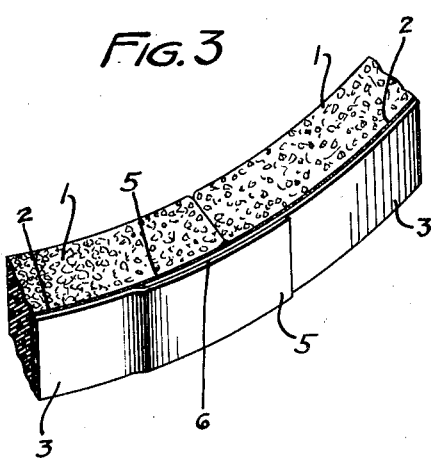
Fig.3
Fig.4
Inventor
GORDON C. BROWN
By Paul, Paul & Moore
ATTORNEYS Patented May 22, 1934

1,960,137

UNITED STATES PATENT OFFICE 1,960,137

ARTICLE OF MANUFACTURE

Gordon C. Brown, Minneapolis, Minn., assignor to Durkee-Atwood Company, Minneapolis, Minn., a corporation of Minnesota Application September 26, 1932, Serial No. 634,902

3 Claims. (Cl. 154—43)

This invention relates to an article of manufacture for use as a draft or rattle eliminating means, or as a sealing means for automobile doors, headlights, ventilators, rumble seat covers, show cases, windows and doors of all kinds, bumpers for doors, grave vault seals, etc.

The principal object of the invention is to provide an article of manufacture as a strip which can be readily attached without the use of tools or, in other words, which is self-attaching. Other objects are: to provide an article of manufacture composed of a strip of sponge rubber having on at least one face a layer of non-drying cement; to protectingly cover such cement or adhesive layer with a pull-off tape which can be removed to expose the cement; to provide a series of strips or sections and to secure them in end-abutted relation; to utilize the cover fabric or pull-off tape as means for securing the end-abutted sections together; to initially have the tape extend beyond the ends of each section so as to be easily grasped; and to provide a coil of such strip material from which suitable lengths can be cut, or released.

Insofar as I am aware, I am the first to use sponge rubber for the present purposes and first to provide an article of manufacture composed of sponge rubber having a layer of adhesive on one surface.

Objects, features and advantages of the invention will be set forth in the description of the drawing forming a part of this application, and in said drawing Figure 1 is a perspective view of the completed article, coiled and ready for use;

Figure 2 is a perspective view of a portion of a strip of sponge rubber showing the layer of tacky adhesive attached thereto and showing the pull tape partly removed to expose the adhesive;

Figure 3 is an enlarged view illustrating the manner of end-abutting and connecting a plurality of lengths or strips of sponge rubber by means of the tape; and Figure 4 is a perspective view of a portion of a strip of sponge rubber showing the integrally attached stretch-preventing layer.

In the drawing, numeral 1 indicates a strip of sponge rubber. In this instance, it has a rectangular cross-sectional configuration. The term "sponge rubber" as used herein means a cellular rubber produced by generation of gases in the stock during or just prior to vulcanization, and which is fully vulcanized and which is comparatively soft, yet resilient, and which contains numerous air cells. The sponge rubber may be prepared by any of the approved methods, but a high grade of sponge rubber is desirable, and it should have as low a pigment content as possible. The rubber should have good compressibility and resiliency, and should be thoroughly cured.

Applied to at least one face of the sponge rubber strip is a layer of tacky rubber adhesive 2 of the so-called non-drying type. Protectingly overlying this adhesive is a tape 3 held by the adhesive in such manner that it may be pulled off to expose the adhesive, preparatory to adhesively securing the strip 1 to any desired object.

A feature of the invention relates to the connecting together in end-abutted relation of a series of strips or sections of rubber, each section having a surface coated with tacky cement, the said surfaces being substantially coplanar. The sections are connected together by the pull tape or Holland cloth 3, and for this purpose, the tape is extended as at 5 beyond each end of each section. After the ends of each section are arranged in butting relation, the terminal portion of the tape of one section is pulled away to expose the adhesive and the projecting portion of the tape of the contiguous section is applied to the exposed adhesive to securely connect the sections. The pulled-away portion is then laid over the connecting terminal portion so that the tapes are arranged in overlapping relation as shown at 6, to extend in opposite directions across the joint. The cover fabric or pull-off tape is thus utilized for securing the end-abutted sections together, the projecting portion of the tape of one length or section being in contact with the adhesive of the end portion of a contiguous section. The connected-together lengths are then spirally coiled as at 7 in a manner to have the tape form the outermost layer. Suitable means 8, such as gummed paper tape, is used for adhesively securing the outermost end of the coil to the adjacent portion of the coil. In this instance, paper tape is adhesively attached to the pull-off tape 3. A similar piece of paper or other suitable tape 10 is applied in a similar manner to the inner end of the coil.

To use the article, the piece of suitable length is cut from the coil (if it is formed of a continuous piece) in a manner to leave a piece of the pull-tape extending beyond the remaining stock at the severing point. The surface to which the strip is to be applied is then wiped with a dry cloth, or the surface, if greasy, is first cleaned with gasoline. The tape 3 is then pulled off to expose the adhesive. It is well to avoid touching the tacky adhesive with the hands. The strip is then applied with the adhesive against the clean surface. In case the strip is so cut that no tape projects, insert a knife blade between the tape and the strip at a point inwardly from the end of both and then move the blade toward the end of the strip to free the tape.

In case the strip is to be used on automobile doors to stop rattles and to reduce the noise of closing, apply the strip to the door post at the hinge side of the door, and to the outer flange on the opposite side and to the top and bottom of the door, thus forming a gasket.

This invention finds valuable application as a means for sealing, for automobile or other doors, or windows, to prevent draft, to stop rattle and to obtain silent closing. The device is self-sealing, requires no mechanical fastening devices and can be easily compressed to at least one-half its normal thickness and will fully recover its original form as soon as the pressure is removed.

The device makes a water and dust-proof seal and finds valuable application for building up or replacing ventilator gaskets for automobiles. Another valuable use is in sealing headlight lenses against dust and water, and the device is so applied as not to be detached when the lens is removed. The device is also usable as a rumble seat gasket to make a water-proof and dust-proof joint. The product of this invention can be spirally wrapped several times, for example, around a steering column next to the floor board to stop draft and prevent entry of dust.

When it is desired to use the article, any suitable length of the same may be unwrapped and separated from the coil, and after removal of the tape 3, the same can be adhesively secured in operative position.

Another advantage of the present device lies in the fact that a plurality of short or long sections can be applied—in end-abutted relation—to complete the sealing structure, and so that a perfectly sealed joint is obtained, in every case. This is due to the compressibility of the sponge rubber. Mitered joints can be made so that they are air and water-tight.

Short lengths can be connected together and coiled as in Figure 1. Short or long pieces, as well as pieces of unequal length, can be combined in end-abutted relation.

In order that the sponge rubber may not be fractured or split lengthwise during removal of the pull tape, I reenforce that side of the tape to which the adhesive is to be applied by means which is made integral with the soft rubber, but which has sufficient tensile strength to prevent undue stretching of the sponge rubber and which is so combined or attached that it cannot be pulled off with the pull tape as it is removed against the action of the adhesive. This is a very important feature, and provides means acting to reenforce the sponge rubber against undue stretching, fracture, and/or splitting, during removal of the pull tape from the adhesive, and also acting to prevent absorption of adhesive by the sponge rubber. This means acts to increase the tensile strength of the final article of manufacture of this invention.

To this end, (see Figure 4) any suitable material such as paper, or leather, or soft-vulcanized rubber 12, may be applied as a reenforcement, to at least one face of the sponge rubber strip or sheet. The attachment may be made by vulcanization or otherwise, providing the elements are practically integrally united. Upon the outer surface of this reenforcing means or material, the tacky adhesive is applied. Then the pull tape is applied over the adhesive in a manner previously described.

One method of supplying this anti-stretch, anti-tear, anti-adhesive-absorbent means is as follows: The desired or necessary amount of rubber stock of the non-sponge or other suitable type is "skimmed" onto a suitable so called "friction" fabric 12, of such quality as to retain by impregnation or otherwise, the proper amount of rubber stock. The rubber stock is applied by passing the fabric between suitable calender rolls having differential speeds, and so operating that the rubber stock is smeared or "frictioned" into the fibers of the fabric or equivalent material. This spreading may be made with various degrees of pressure according to the result desired. This "friction" stock may be a soft-vulcanizing rubber. After the non-sponge stock is frictioned into the cloth, this rubber-impregnated material is attached to the sponge rubber (or the sponge rubber is applied to the strip) by passing the strip through rolls and feeding the sponge rubber stock thereonto in suitable quantity. The material is then vulcanized, and the result is that the sponge rubber is provided with what may be considered a non-stretchable, non-adhesive-absorbent, integral, skin layer. Vulcanization is ordinarily completed in a chamber having a greater height or thickness than that of the unvulcanized stock. That is, the combined thicknesses of the layer of the "friction fabric" and sponge rubber stock is less than the corresponding dimension of the material after vulcanization, so that during vulcanization the sponge rubber can expand and assume a porous cellular or air-filled condition. The length of time of vulcanization may be varied. The tacky adhesive is now applied to the skin layer, and no absorption by the sponge rubber occurs.

An alternate method for providing the reenforcing layer is to "friction" into the fabric 12 a sufficient amount of the sponge rubber material or stock (instead of non-sponge rubber stock), and then apply a thicker layer of sponge rubber stock thereto and then vulcanize to integrally attach the sponge rubber impregnated or surfaced strip to the very much thicker layer or strip of sponge rubber. It will be understood, of course, that the rubber "friction" stock may be either of the sponge or non-sponge type. Moreover, the frictioning of the stock into the tape 12 may be dispensed with, and a thin layer of non-sponge rubber may be formed and then vulcanized to the thicker layer of sponge rubber.

There is, of course, no intention to be limited to any specific non-stretching material, nor to the manner or method of making it a substantially integral part of the sponge rubber strip.

I claim as my invention:

1. A packing strip comprising a strip of thick sponge rubber having vulcanized to at least one face a very much thinner layer of rubberized material of a nature to prevent that degree of stretching of the sponge rubber which would result in its fracture, a layer of tacky adhesive material applied to said layer of material, and a protecting material detachably secured by and covering said adhesive, said layer of anti-stretching material being of a nature to prevent absorption of the adhesive by the sponge rubber.

2. A prepared and ready to use packing element comprising a strip of sponge rubber, a layer of frictioned fabric vulcanized to one face of said sponge rubber strip, a layer of tacky adhesive material applied to said fabric layer, and a protecting material detachably secured by and covering said adhesive, said layer of fabric serving to prevent that degree of stretching of the sponge rubber strip which would result in its fracture and serving also to prevent absorption of the adhesive by said sponge rubber strip.

3. A prepared and ready-to-use packing element comprising a strip of sponge rubber, a layer of rubberized material vulcanized to said sponge rubber strip, a layer of tacky adhesive material applied to said rubberized layer, and a protecting material detachably secured by and covering said adhesive, said layer of rubberized material serving to prevent that degree of stretching of the sponge rubber strip which would result in its fracture and serving also to prevent absorption of the adhesive by said sponge rubber strip.

GORDON C. BROWN.